United States Patent
Guy et al.

(10) Patent No.: US 10,538,995 B2
(45) Date of Patent: Jan. 21, 2020

(54) HYDROCARBON PRODUCTION METHOD COMPRISING A PRODUCTIVITY INDEX OF THE WELLS SUBJECT TO THERMAL EFFECT

(71) Applicant: IFP Energies nouvelles, Rueil-Malmaison (FR)

(72) Inventors: Nicolas Guy, Paris (FR); Christophe Preux, Acheres (FR); Iryna Malinouskaya, Le Port Marly (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 450 days.

(21) Appl. No.: 15/406,351

(22) Filed: Jan. 13, 2017

(65) Prior Publication Data
US 2017/0204706 A1    Jul. 20, 2017

(30) Foreign Application Priority Data
Jan. 15, 2016 (FR) .................. 16 50309

(51) Int. Cl.
| G06F 17/10 | (2006.01) |
| E21B 41/00 | (2006.01) |
| E21B 43/24 | (2006.01) |
| G06F 17/11 | (2006.01) |
| G06F 17/50 | (2006.01) |
| G06G 7/48 | (2006.01) |

(52) U.S. Cl.
CPC .......... *E21B 41/0092* (2013.01); *E21B 43/24* (2013.01); *G06F 17/11* (2013.01); *G06F 17/5018* (2013.01); *G06F 2217/16* (2013.01)

(58) Field of Classification Search
CPC .......................... G06F 17/5018; G06F 17/11
USPC .................................... 703/2, 9, 10
See application file for complete search history.

(56) References Cited

U.S. PATENT DOCUMENTS

| 6,549,879 B1 * | 4/2003 | Cullick ............... E21B 49/00 703/10 |
| 2013/0118736 A1 * | 5/2013 | Usadi ............... G06F 17/5018 166/268 |
| 2015/0007988 A1 * | 1/2015 | Ayasse ............... E21B 43/17 166/271 |

OTHER PUBLICATIONS

Zandi et al. (Numerical Coupling of Geomechanics and Fluid Flow during Steam Injection in SAGD. (Year: 2011).*
Zarkesh et al. (Exploitation Management of Underground Dams by Using Mathematical Models of Finite Difference in GMS7.1 (Year: 2012).*

* cited by examiner

*Primary Examiner* — Andre Pierre Louis
(74) *Attorney, Agent, or Firm* — Fitch, Even, Tabin & Flannery LLP

(57) ABSTRACT

The present invention relates to a production method for hydrocarbons contained in an underground formation penetrated by at least one well. The method is based on the determination of at least one productivity index IP dependent on the temperature and pressure.

12 Claims, 2 Drawing Sheets

HYDROCARBON PRODUCTION METHOD COMPRISING A PRODUCTIVITY INDEX OF THE WELLS SUBJECT TO THERMAL EFFECT

CROSS-REFERENCE TO RELATED APPLICATION

Reference is made to French Patent Application No. 16/50.309 filed Jan. 15, 2016, which is incorporated herein by reference in its entirety.

BACKGROUND OF THE INVENTION

Field of the Invention

The present invention relates to underground environments through which wells are drilled, and in particular the exploitation of underground deposits containing hydrocarbons.

Description of the Prior Art

To best exploit the underground environments, the oil industry defines numerical models of the reservoir zones in order to control the process of exploitation of the oil fields.

The technique which accounts for thermal effects at the permeability level accounted for in the reservoir models, by updating the permeability as a function of the pressure, temperature, variation of porosity and volume constraints is known. Moreover, such a technique has been proposed by Ojagbohunmi et al. (2012) where the permeability is a function of the porosity, which is itself a function of the pressure and temperature (Tran et al., 2004).

There are also methods for calculating well productivity indices (IP). In particular, these productivity indices can be estimated as a function of the permeability of the underlying meshes by the Peaceman (1983) or Mochizuki (1995) methods, to cite only the best known.

S. Ojagbohunmi, R. Chalaturnyk, J. Leung, *Coupling of Stress Dependent Relative Permeability and Reservoir Simulation*. SPE 154083, 2012.

D. Tran, A. Settari, L. Nghiem, *New Iterative Coupling Between a Reservoir Simulator and a Geomechanics Module*. SPE 2004.

D. W. Peaceman, *Interpretation of Well-Block Pressures in Numerical Reservoir Simulation with Nonsquare Grid Blocks and Anisotropic Permeability*. SPE, 1983.

S. Mochizuki, *Well Productivity for Arbitrarily Inclined Well*. SPE 029133, 1995.

In the literature, there are methods which combine the two techniques and take into account the effects of the pressure on the productivity indices, by making them depend on the permeability, which is dependent on the porosity, which is itself a function of the pressure.

However, the literature does not include any method in which the productivity indices of the wells are a function of the permeability which would itself is a function of the pressure, and also more particularly of the temperature. In effect, the porosity is not generally dependent on temperature. This implies that, in all cases, if the thermal effects can be taken into account in the permeability at the field level, they are not taken into account specifically at the drilled well level, which induces a significant uncertainty as to the production of hydrocarbons of the wells via the calculation of the production index IP.

SUMMARY OF THE INVENTION

The present invention remedies this problem. The invention better accounts for the thermal effects, and more particularly the thermal effects in the environment of the wells. By incorporating these thermal effects in determining the productivity indices of the wells, it is possible to obtain a more accurate reservoir model and obtain results, and production estimations, that are closer to the reality.

The production method according to the invention implements a model that is optimized from the point of view of determination of the productivity indices, or index.

Thus, the present invention relates to a production method for hydrocarbons contained in an underground formation through which at least one well passes. For this method, the following steps are carried out:

a computer is used to construct a numerical model of the underground formation comprising meshes, and accounts for at least petrophysical data applied to the meshes, and the characteristics of at least one well passing through the underground formation;

a function of pressure and temperature dependencies of the permeabilities accounted for the model is determined;

a model of productivity index as a function of the permeability of the meshes is determined;

for at least one mesh of the model, a pressure and temperature dependent productivity index is determined, by accounting for the functions of pressure and temperature dependencies of the permeabilities, and the productivity index model; and the underground formation is exploited as a function of the productivity index.

According to an embodiment of the invention, the functions of pressure and temperature dependencies of the permeabilities which are accounted for in the model comprise permeability multipliers $\text{Mult}_i(T,P)$.

According to an embodiment of the invention, the multipliers are determined by using the modifications of the porosity as a function of temperature and pressure.

According to an implementation of the invention, the calculation of the productivity index is performed according to a relationship:

$$IP(K_{\text{eff}}) = \frac{2\pi \sqrt{K_{\text{eff}}^x K_{\text{eff}}^y}\, h}{\ln\left(\frac{r_0}{r_w}\right) + s}$$

with the thickness being perpendicular to the flow h, well radius $r_w$, drainage radius $r_0$ and skin factor s.

According to an embodiment of the invention, the method is applied to a thermal drainage method.

Advantageously, the productivity index can be determined for the meshes of the numerical model affected by the well.

Furthermore, the invention relates to a computer program product that can be downloaded from a communication network and/or stored non transiently on a computer-readable medium and/or that can be executed by a processor, comprising program code instructions for implementing the method as described above, when the program is run on a computer.

BRIEF DESCRIPTION OF THE DRAWINGS

The invention will be better understood on reading the following description of a nonlimiting example illustrated by the figures attached hereinbelow, in particular.

DETAILED DESCRIPTION OF THE INVENTION

Figure 1:
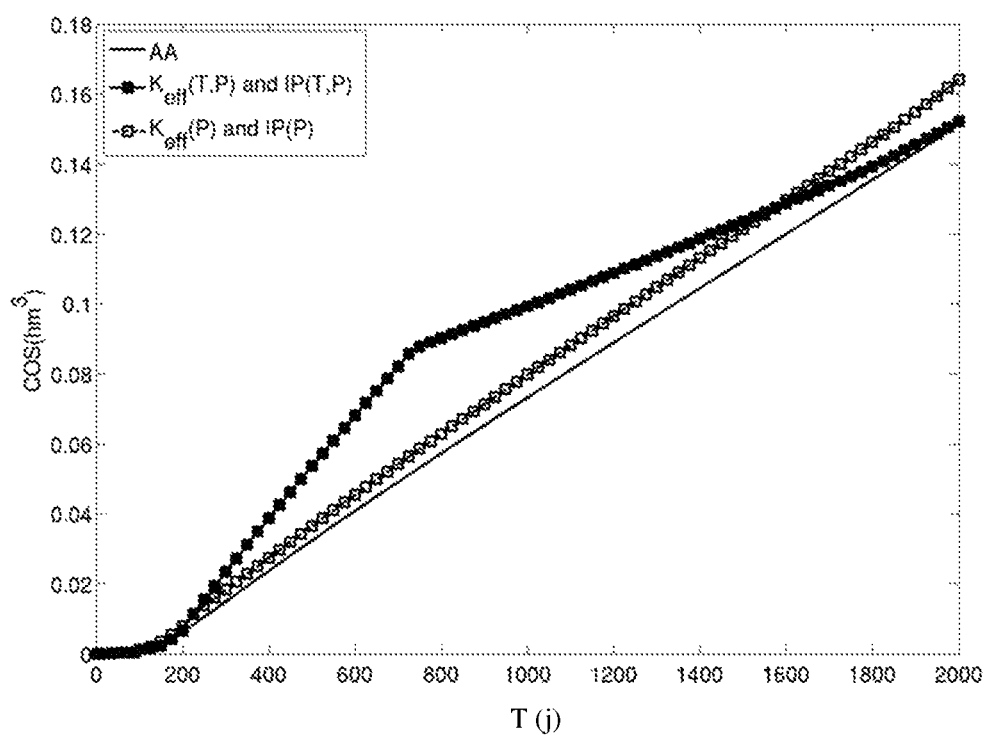
FIG. 1 shows the curves of aggregate production as a function of time in the following three cases: a) without the geomechanical effects, b) with pressure effect alone on the permeabilities and on the IP, c) with the thermal and pressure effects on the permeabilities and on the IP.

The present invention relates to the field of the exploitation of underground environments, which makes possible better accounting for the thermal effects and more particularly the thermal effects close to wells by incorporating these effects in the productivity indices IP of the wells. It is therefore possible to obtain a more accurate reservoir model. In particular, this invention makes it possible to obtain more accurate production results.

It should be noted that a productivity index IP defines the production capacity of a well. This productivity index makes possible planning of the equipment of a well for a determined flow rate or the head loss that must be imposed on a well.

In order to best exploit the underground environments, the oil industry defines numerical models making possible better control and exploitation of the oil fields.

The first step in these exploitation studies creates a numerical model which best represents the geological and petrophysical data of the porous medium, for example the facies, the permeabilities, or the porosities of the reservoir rock. Also defined in this model is the position of the drilled wells and their mode of exploitation including flow rate, pressure, fluids injected, nature of the products injected, etc.

The second step defines the thermal effects.

Conventionally, temperature and pressure dependencies K(T,P) are added to the permeabilities. In order to not have to change the permeabilities defined in the first step, the thermal effects are accounted for by defining a permeability multiplier Mult(T,P) in order to have an effective permeability $K_{eff}(T,P)=Mult(T,P)*K(T,P)$. In this way, the thermal effects are taken into account over all the meshes of the model, but are not taken into account on the productivity indices of the wells. The factors Mult(T,P) can be obtained by physical or empirical laws, for example as per Touhidi-Baghini (1998).

Touhidi-Baghini, A.: "*Absolute Permeability of McMurray Formation Oil Sands at Low Confining Stress*, Department of Civil and Environmental Engineering, University of Alberta, Ph.D. Dissertation, 1998.

The present invention makes it possible to account for these effects on the productivity indices (IP) by first choosing a method for calculating IP as a function of the permeability, for example, the so-called "Peaceman" method, or the projection method (based on the "Peaceman" method), or similar. In effect, physically, the permeability of the mesh drilled by a well necessarily has an impact on the productivity index of the well.

The productivity indices of the wells IP(T,P) are then calculated for at least one mesh, and preferably for each mesh drilled by the wells by using the permeability updated in the second step: $K_{eff}(T,P)$. This accounts for the permeability multiplier, or the temperature and pressure dependency of the permeability.

The "Peaceman" method cited above can notably be found described in the following documents:

Peaceman, D. W.: "*Interpretation of Well-Block pressures in Numerical Reservoir Simulation*", paper SPE 6893, presented at the SPE-AIME $52^{nd}$ Annual Fall Technical Conference and Exhibition, Denver, Oct. 9-12, 1977

Peaceman, D. W.: "*Interpretation of Well-Block pressures in Numerical Reservoir Simulation With Nonsquare Grid Blocks and Anisotropic Permeability*", paper SPE 10528, presented at the 1982 SPE Symposium on Reservoir Simulation, New Orleans, Jan. 31-Feb. 3

Peaceman, D. W.: "*Interpretation of Well-Block pressures in Numerical Reservoir Simulation: Part 3 —Off-Center and Multiple Wells Within a Well-Block*", paper SPE 16976, presented at the 1987 SPE Annual Technical Conference and Exhibition, Dallas, Sep. 27-30

According to the present invention, the production method for hydrocarbons contained in an underground formation, for example a reservoir rock, penetrated by at least one drilled well is a method comprising the following five steps:

1 Generation of a numerical model of the reservoir;
2 Definition of the temperature dependencies of the permeability;
3 Choice of a model of the productivity indices of the wells with permeability dependency of the mesh drilled;
4 Calculation of the productivity indices of the wells by using the temperature dependent permeabilities obtained in the step 2; and
5 Exploitation of the reservoir.

1) Generation of a Fine Geological Model

This first step uses a computer and modeling software to construct a reservoir model comprising meshes, petrophysical properties applied to the meshes, and well positions and trajectories. Thus, the reservoir model represents the underground formation. The physical properties can notably comprise the permeability and porosity.

2) Definition of the Pressure and Temperature Dependencies of the Permeability

The second step defines the thermal effects. Conventionally temperature and pressure dependencies $K_i(T,P)$, where i represents the direction (x, y or z), are added to the permeabilities. The permeability $K_i(T,P)$ is obtained in the reservoir model constructed in the preceding step.

According to an embodiment of the invention, in order to modify the initial permeabilities defined in the step 1 in the geological model, the thermal effects can be accounted for by introducing a permeability multiplier $Mult_i(T,P)$ in order to have an effective permeability $K^i_{eff}(T,P)=Mult_i(T,P)*K_i$.

According to a variant embodiment of the invention, the factors $Mult_i(T,P)$ can be obtained by physical or empirical laws (for example Touhidi-Baghini (1998)).

According to a variant embodiment of the invention, the factors $Mult_i(T,P)$ can be obtained by from a reservoir simulator, for example the PumaFlow® (IFP Energies nouvelles, France) software.

3) Choice of a Model of the Productivity Indices of the Wells with Dependency on the Permeability of the Drilled Mesh.

In this step, a relationship (also called model or calculation method) is determined between the productivity indices and the permeability. A model involving the so-called effective permeability is chosen.

According to an embodiment of the invention, the productivity index for a vertical well can be estimated by the Peaceman formula:

$$IP(K_{eff}) = \frac{2\pi\sqrt{K_{eff}^x K_{eff}^y}\, h}{\ln\left(\frac{r_0}{r_w}\right)+s} \quad (1)$$

With: the thickness perpendicular to the flow h, well radius $r_w$, drainage radius $r_0$ and "skin factor" (which is a dimensionless factor which reflects the head losses generated by a flow rate restriction in proximity to the wells) s.

Note that $r_0$ is a function of the permeability:

$$r_0 = 0.28 \frac{\left[\left(\frac{K_{eff}^x}{K_{eff}^y}\right)^{1/2}\Delta x^2 + \left(\frac{K_{eff}^y}{K_{eff}^x}\right)^{1/2}\Delta y^2\right]^{1/2}}{\left(\frac{K_{eff}^y}{K_{eff}^x}\right)^{1/4} + \left(\frac{K_{eff}^x}{K_{eff}^y}\right)^{1/4}} \quad (2)$$

4) Calculation of the Productivity Indices of the Wells by Using the Permeabilities Dependent on T and P Obtained in the Step 2.

Then, at least one productivity index of the wells IP(T,P) is calculated for at least one mesh of the reservoir model, and preferably for each mesh of the reservoir model drilled by the well(s) by using the effective permeabilities updated in the step 2: $K^x_{eff}(T,P)$ and $K^y_{eff}(T,P)$ that is accounting for the permeability multiplier, or, more generally, the function of pressure and temperature dependency of the permeability. If f(x, ... ) represents the formula used to calculate the IP, then the relationship applies:

$$IP(T,P)=f(K_{eff}^x(T,P),K_{eff}^y(T,P)\ldots)$$

By using the "Peaceman" formulae (1, 2) and the expression of $K_{eff}(T,P)$, the productivity index as a function of T and P is obtained $$IP(T,P) = \frac{2\pi h}{\ln\left(\frac{r_0^*}{r_w}\right)+s}\sqrt{Mult_x(T,P) * K_{eff}^x * Mult_y(T,P) * K_{eff}^y}$$

with $r_0^*$:

$$r_0^* = 0.28 \frac{\sqrt{Mult_y(T,P)*K_{eff}^y \Delta x^2 + Mult_x(T,P)*K_{eff}^x \Delta y^2}}{\sqrt{Mult_y(T,P)*K_{eff}^y} + \sqrt{Mult_x(T,P)*K_{eff}^x}}$$

The present invention accounts for the thermal effects on the productivity indices of the wells by accounting for thermal effects on the permeability by showing the permeability multiplier in the IP formula.

5) Exploitation of the Reservoir

In this step, the underground formation is exploited, meaning hydrocarbons are produced, as a function of the well productivity indices determined in the preceding step.

According to an embodiment of the invention, from the productivity indices of the wells, it can be determined that a number of exploitation schemes can be determined corresponding to different possible exploitation configurations of the underground reservoir: placement of the production and/or injection wells, target values for the flow rates per well and/or for the reservoir, the type of tools being used, the fluids used, injected and/or recovered, etc. These production schemes can be simulated by a flow simulator and the reservoir model.

From the productivity indices of the wells, and from any flow simulations, by comparison, the exploitation scheme can be chosen which seems to them most relevant. For example:

by comparing the maximum of the volume of oil recovered, it is possible to determine the production scheme likely to provide the maximum recovery or to be the most cost-effective.

by comparing the standard deviation of the volume of oil recovered, it is possible to determine the production scheme with the least risk.

The reservoir is then exploited according to the exploitation scheme that is chosen, for example by drilling new wells (production or injection), by modifying the tools being used, by modifying the flow rates and/or the nature of fluids injected, etc.

The invention relates moreover to a computer program product that can be downloaded from a communication network and/or stored non transparently on a computer-readable medium and/or that can be executed by a processor. This program comprises program code instructions for implementing the method as described above, when the program is run on a computer.

EXAMPLES

In order to show the benefit of this method for the production simulation, it is applied to a simplified reservoir production case.

An SAGD (Steam-assisted gravity drainage) simulation model is used with a production well and an injection well. First of all, the sealed wells are preheated, then the wells are opened to equalize the pressure. Steam is injected into the injection well and the production of oil is observed in the production well. The variations of the temperature and of the pressure are very significant in this process which will make it possible to reveal their roles in the geomechanical effects.

The influence accounting for the variation of permeability with the temperature and pressure on production will be demonstrated. For that, a comparison will be drawn between the results of the simulations:

without the geomechanical effects, according to the prior art (denoted AA), only with the effects of the pressure on the permeabilities and on the IP, according to the prior art (denoted $K_{eff}(T,P)$ and IP(T,P)); and with the thermal and pressure effects on the permeabilities and on the IP according to the invention (denoted $K_{eff}(T,P)$ and IP(T,P)).

The initial permeabilities are $K_x=K_y=2000$ mD and $K_z=1000$ mD. The multipliers are calculated by using the modifications of the porosity as a function of the temperature and the pressure according to the relationship:

$$\Phi=\Phi_0 \exp\{c_p(P-P_0)+c_T(T-T_0)\}$$

and by using an approximation of the empirical Touhidi-Baghini law (1998) in which $\Phi_0$, $T_0$ and $p_0$ are, respectively: the initial porosity, temperature and pressure, $c_p$ is the rock compressibility and $c_T$ is the thermal expansion according to the relationship:

$$Mult_i(P,T) = \frac{K_i^{eff}}{K_i} = \exp\left(\frac{c_i \times \varepsilon_i}{\phi_0}\right)$$

with i denoting one of the axes x, y and z, and $c_x=c_y=2$, $c_z=5$, and with $c_x$, $c_y$ and $c_z$ being parameters of the material and $\varepsilon_v$ a volume stress calculated by considering the variations of the porosity and of the temperature, $\varepsilon_v = \Phi_0 c_p(P-P_0) + 3\alpha_d(T-T_0)$ with $\alpha_d$ being the drained thermal expansion coefficient.

Their values are given in tables 1 and 2, the multipliers are dependent on the direction being considered, either horizontal or vertical. For this illustrative and nonlimiting example, the factors Mult(T,P) are obtained by physical or empirical laws, as described in the Touhidi-Baghini document (1998). Touhidi-Baghini, A.: "*Absolute Permeability of McMurray Formation Oil Sands at Low Confining Stress*, Department of Civil and Environmental Engineering, University of Alberta, Ph.D. Dissertation, 1998.

FIG. 1 shows the curves of aggregate oil production (COS) as a function of time (T) for all these cases.

By considering a permeability and IPs that are variable as a function of temperature and pressure, $K_{eff}(T,P)$ and IP(T,P), by the method according to the invention described above (curve (-■-)), the estimation of production is obtained that is significantly different compared to the case without the thermal effects $K_{eff}(P)$ and IP(P) (curve (--□--)) according to the prior art. Initially, the effect of the rise in temperature increases the permeabilities and the IPs. That results in faster production than in the case without temperature effect. Since the oil is produced more rapidly, a lowering of production is observed after 700 days.

Figure 2A:
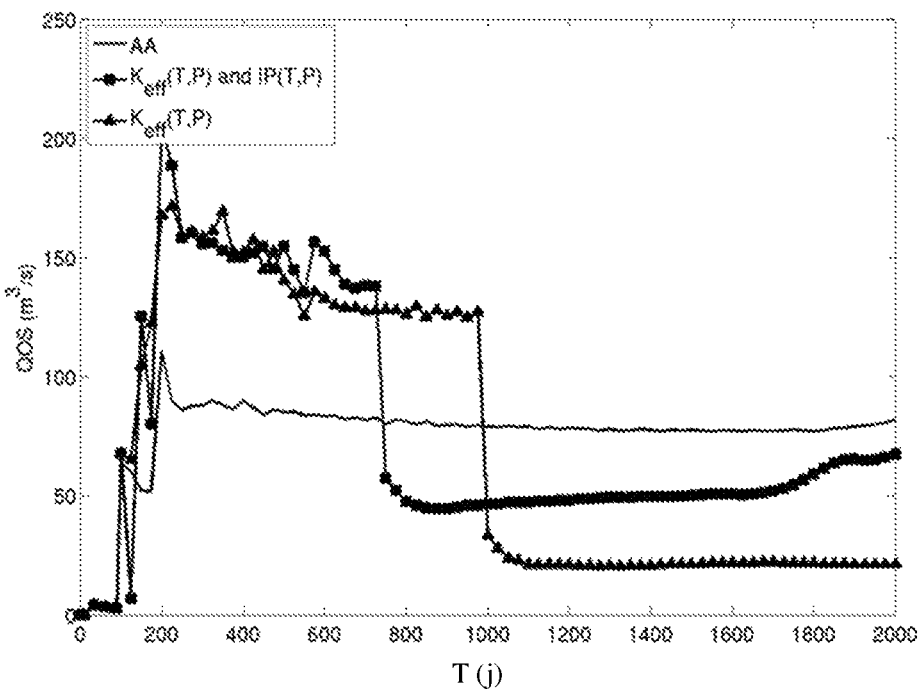
FIGS. 2a and 2b give the production flow rates for the same three cases and their production aggregates.
Figure 2B:
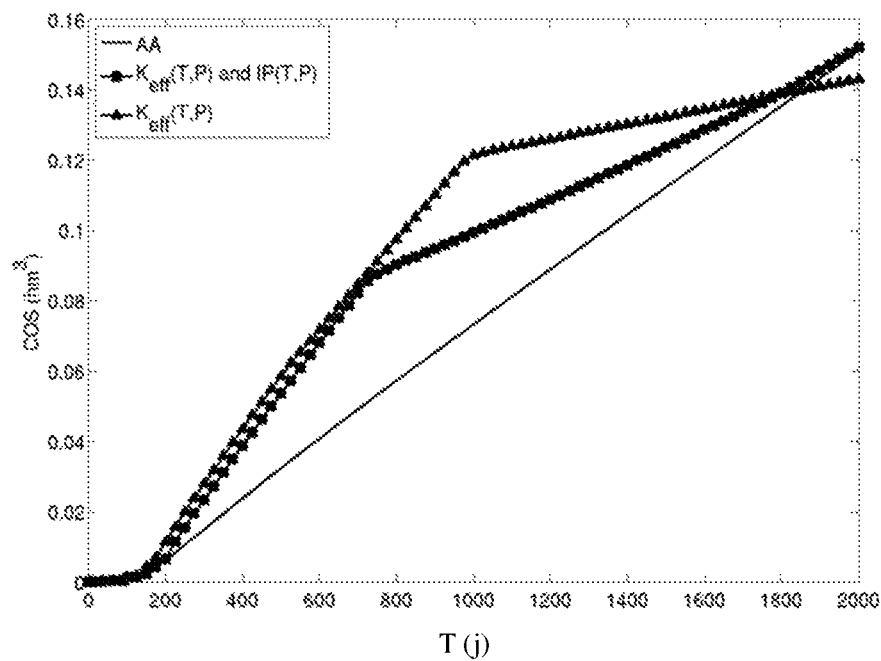

FIG. 2a shows the oil flow rate at the surface as a function of time. It can be seen that accounting for the geomechanical effects for the productivity indices influences the oil flow rate in the production well. Consequently, the aggregate oil production (COS) at the end of the period is modified (FIG. 2b). In effect, the temperature tends to increase the permeability of the medium, for example, by the activation of microfractures and, consequently, it also increases the value of the productivity index. The accounting for the thermal IPs (curve $K_{eff}(T,P)$ and IP(T,P)) according to the invention speeds up the arrival of water at the producer, and therefore oil productivity drops (FIG. 2a) at around 750 days. In FIG. 2b, it will be noted that the drop in oil productivity occurs earlier if the thermal effects on the IPs are taken into account. Thus, the IPs(T,P) obtained according to this present invention make it possible to better estimate the production and optimize a production method. Consequently, it is important to take account of the IP variations provoked by temperature variations to correctly estimate the production, notably in the cases where the temperature changes significantly.

TABLE 1

Multipliers $Mult_{x,y}$ (T,P) defined for the pressure P (col) and the temperature T (rows)

| P (bar)\ T (° C.) | 0 | 5 | 10 | 15 | 20 | 25 | 30 | 35 | 40 | 45 | 50 | 55 | 60 |
|---|---|---|---|---|---|---|---|---|---|---|---|---|---|
| 0 | 0.9418 | 0.9512 | 0.9608 | 0.9704 | 0.9802 | 0.9900 | 1.0000 | 1.0101 | 1.0202 | 1.0305 | 1.0408 | 1.0513 | 1.0618 |
| 25 | 0.9656 | 0.9753 | 0.9851 | 0.9950 | 1.0050 | 1.0151 | 1.0253 | 1.0356 | 1.0460 | 1.0565 | 1.0672 | 1.0779 | 1.0887 |
| 50 | 0.9900 | 1.0000 | 1.0101 | 1.0202 | 1.0305 | 1.0408 | 1.0513 | 1.0618 | 1.0725 | 1.0833 | 1.0942 | 1.1052 | 1.1163 |
| 75 | 1.0151 | 1.0253 | 1.0356 | 1.0460 | 1.0565 | 1.0672 | 1.0779 | 1.0887 | 1.0997 | 1.1107 | 1.1219 | 1.1331 | 1.1445 |
| 100 | 1.0408 | 1.0513 | 1.0618 | 1.0725 | 1.0833 | 1.0942 | 1.1052 | 1.1163 | 1.1275 | 1.1388 | 1.1503 | 1.1618 | 1.1735 |
| 125 | 1.0672 | 1.0779 | 1.0887 | 1.0997 | 1.1107 | 1.1219 | 1.1331 | 1.1445 | 1.1560 | 1.1677 | 1.1794 | 1.1912 | 1.2032 |
| 150 | 1.0942 | 1.1052 | 1.1163 | 1.1275 | 1.1388 | 1.1503 | 1.1618 | 1.1735 | 1.1853 | 1.1972 | 1.2092 | 1.2214 | 1.2337 |
| 175 | 1.1219 | 1.1331 | 1.1445 | 1.1560 | 1.1677 | 1.1794 | 1.1912 | 1.2032 | 1.2153 | 1.2275 | 1.2399 | 1.2523 | 1.2649 |
| 200 | 1.1503 | 1.1618 | 1.1735 | 1.1853 | 1.1972 | 1.2092 | 1.2214 | 1.2337 | 1.2461 | 1.2586 | 1.2712 | 1.2840 | 1.2969 |
| 225 | 1.1794 | 1.1912 | 1.2032 | 1.2153 | 1.2275 | 1.2399 | 1.2523 | 1.2649 | 1.2776 | 1.2905 | 1.3034 | 1.3165 | 1.3298 |
| 250 | 1.2092 | 1.2214 | 1.2337 | 1.2461 | 1.2586 | 1.2712 | 1.2840 | 1.2969 | 1.3100 | 1.3231 | 1.3364 | 1.3499 | 1.3634 |
| 275 | 1.2399 | 1.2523 | 1.2649 | 1.2776 | 1.2905 | 1.3034 | 1.3165 | 1.3298 | 1.3431 | 1.3566 | 1.3703 | 1.3840 | 1.3979 |
| 300 | 1.2712 | 1.2840 | 1.2969 | 1.3100 | 1.3231 | 1.3364 | 1.3499 | 1.3634 | 1.3771 | 1.3910 | 1.4049 | 1.4191 | 1.4333 |

TABLE 2

Multipliers $Mult_z$ (T,P) defined for the pressure P (col) and the temperature T

| P (bar)\ T (° C.) | 0 | 5 | 10 | 15 | 20 | 25 | 30 | 35 | 40 | 45 | 50 | 55 | 60 |
|---|---|---|---|---|---|---|---|---|---|---|---|---|---|
| 0 | 0.8607 | 0.8825 | 0.9048 | 0.9277 | 0.9512 | 0.9753 | 1.0000 | 1.0253 | 1.0513 | 1.0779 | 1.1052 | 1.1331 | 1.1618 |
| 25 | 0.9162 | 0.9394 | 0.9632 | 0.9876 | 1.0126 | 1.0382 | 1.0645 | 1.0914 | 1.1191 | 1.1474 | 1.1764 | 1.2062 | 1.2368 |
| 50 | 0.9753 | 1.0000 | 1.0253 | 1.0513 | 1.0779 | 1.1052 | 1.1331 | 1.1618 | 1.1912 | 1.2214 | 1.2523 | 1.2840 | 1.3165 |
| 75 | 1.0382 | 1.0645 | 1.0914 | 1.1191 | 1.1474 | 1.1764 | 1.2062 | 1.2368 | 1.2681 | 1.3002 | 1.3331 | 1.3668 | 1.4014 |
| 100 | 1.1052 | 1.1331 | 1.1618 | 1.1912 | 1.2214 | 1.2523 | 1.2840 | 1.3165 | 1.3499 | 1.3840 | 1.4191 | 1.4550 | 1.4918 |
| 125 | 1.1764 | 1.2062 | 1.2368 | 1.2681 | 1.3001 | 1.3331 | 1.3668 | 1.4014 | 1.4369 | 1.4733 | 1.5106 | 1.5488 | 1.5880 |
| 150 | 1.2523 | 1.2840 | 1.3165 | 1.3499 | 1.3840 | 1.4191 | 1.4550 | 1.4918 | 1.5296 | 1.5683 | 1.6080 | 1.6487 | 1.6905 |
| 175 | 1.3331 | 1.3668 | 1.4014 | 1.4369 | 1.4733 | 1.5106 | 1.5488 | 1.5880 | 1.6282 | 1.6695 | 1.7117 | 1.7551 | 1.7995 |
| 200 | 1.4191 | 1.4550 | 1.4918 | 1.5296 | 1.5683 | 1.6080 | 1.6487 | 1.6905 | 1.7333 | 1.7771 | 1.8221 | 1.8682 | 1.9155 |
| 225 | 1.5106 | 1.5488 | 1.5880 | 1.6286 | 1.6695 | 1.7117 | 1.7551 | 1.7995 | 1.8450 | 1.8917 | 1.9396 | 1.9887 | 2.0391 |
| 250 | 1.6080 | 1.6487 | 1.6905 | 1.7333 | 1.7771 | 1.8221 | 1.8682 | 1.9155 | 1.9640 | 2.0138 | 2.0647 | 2.11700 | 2.1706 |
| 275 | 1.7117 | 1.7551 | 1.7995 | 1.8450 | 1.8917 | 1.9396 | 1.9887 | 2.0391 | 2.0907 | 2.1436 | 2.1979 | 2.2535 | 2.3106 |
| 300 | 1.8221 | 1.8682 | 1.9155 | 1.9640 | 2.0138 | 2.0647 | 2.1170 | 2.1706 | 2.2255 | 2.2819 | 2.3396 | 2.3989 | 2.4596 |

The invention claimed is:

1. A method for hydrocarbon production from an underground formation penetrated by at least one well, comprising:
    constructing a numerical model including permeabilities of the underground formation with a computer with the model comprising meshes which account for at least petrophysical data applied to the meshes, and characteristics of at least one well which penetrates through the underground formation;
    determining a function of pressure and temperature dependency of permeabilities accounted for in the model;
    determining a model of productivity index as a function of the permeabilities of the meshes;
    determining for at least one mesh of the model, a pressure and temperature dependent productivity index, by accounting for the functions of pressure and temperature dependency of the permeabilities, and the model of productivity index;
    exploiting the underground formation as a function of the productivity index; and
    determining of the productivity index is performed according to a relationship:

$$IP(K_{eff}) = \frac{2\pi\sqrt{K_{eff}^x K_{eff}^y}\, h}{\ln\left(\frac{r_0}{r_w}\right) + s}$$

wherein thickness is perpendicular to flow h, well radius $r_w$, drainage radius $r_0$ and skin factor s.

2. The hydrocarbon production method as claimed in claim 1, wherein the functions of pressure and temperature dependency of the permeabilities which are accounted for in the numerical model comprise permeability multipliers.

3. The hydrocarbon production method as claimed in claim 2, wherein the multipliers are determined by using modifications of porosity as a function of temperature and pressure.

4. The hydrocarbon production method as claimed in claim 1, comprising exploiting the underground formation by performing thermal drainage.

5. The hydrocarbon production method as claimed in claim 2, comprising exploiting the underground formation by performing thermal drainage.

6. The hydrocarbon production method as claimed in claim 3, comprising exploiting the underground formation by performing thermal drainage.

7. The hydrocarbon production method as claimed in claim 1, comprising determining the productivity index for the meshes of the numerical model which are affected by the well.

8. The hydrocarbon production method as claimed in claim 2, comprising determining the productivity index for the meshes of the numerical model which are affected by the well.

9. The hydrocarbon production method as claimed in claim 3, comprising determining the productivity index for the meshes of the numerical model which are affected by the well.

10. The hydrocarbon production method as claimed in claim 4, comprising determining the productivity index for the meshes of the numerical model which are affected by the well.

11. The hydrocarbon production method as claimed in claim 5, comprising determining the productivity index for the meshes of the numerical model which are affected by the well.

12. A computer program product that non transiently stores on a computer-readable medium comprising program code instructions for implementing a method preformed on a computer used as part of exploitation of the underground formation comprising the steps of:
    constructing a numerical model including permeabilities of the underground formation with a computer with the model comprising meshes which account for at least petrophysical data applied to the meshes, and characteristics of at least one well which penetrates through the underground formation;
    determining a function of pressure and temperature dependency of permeabilities accounted for in the model;
    determining a model of productivity index as a function of the permeabilities of the meshes;
    determining for at least one mesh of the model, a pressure and temperature dependent productivity index, by accounting for the functions of pressure and temperature dependency of the permeabilities, and the model of productivity index; wherein
    determining the productivity index is performed according to a relationship:

$$IP(K_{eff}) = \frac{2\pi\sqrt{K_{eff}^x K_{eff}^y}\, h}{\ln\left(\frac{r_0}{r_w}\right) + s}$$

wherein thickness is perpendicular to flow h, well radius $r_w$, drainage radius $r_0$ and skin factor s; and exploiting the underground formation as a function of the productivity index.

* * * * *